(12) United States Patent
Duenisch et al.

(10) Patent No.: US 9,670,946 B2
(45) Date of Patent: Jun. 6, 2017

(54) SCREWED ASSEMBLY

(71) Applicant: Bayerische Motoren Werke Aktiengesellschaft, Munich (DE)

(72) Inventors: Robert Duenisch, Munich (DE); Benjamin Koch, Munich (DE); Norbert Wendland, Munich (DE); Peter Hirsch, Freising (DE); Helmut Gottmann, Hohenthann/Schmatzhausen (DE); Dieter Rapp, Reichling (DE); Thomas Klawunn, Dingolfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 108 days.

(21) Appl. No.: 14/734,550

(22) Filed: Jun. 9, 2015

(65) Prior Publication Data
US 2015/0275944 A1 Oct. 1, 2015

Related U.S. Application Data

(63) Continuation of application No. PCT/EP2013/074673, filed on Nov. 26, 2013.

(30) Foreign Application Priority Data

Dec. 10, 2012 (DE) .......... 10 2012 222 640

(51) Int. Cl.
*F16B 25/00* (2006.01)
*F16B 5/02* (2006.01)
(Continued)

(52) U.S. Cl.
CPC .............. *F16B 5/02* (2013.01); *B62D 27/065* (2013.01); *F16B 25/0021* (2013.01);
(Continued)

(58) Field of Classification Search
CPC ....... F16B 5/02; F16B 25/0021; F16B 25/106
(Continued)

(56) References Cited

U.S. PATENT DOCUMENTS 2,654,284 A * 10/1953 Schevenell ......... F16B 25/0021
408/216
4,647,263 A * 3/1987 Macfee, Jr. .......... F16B 37/048
411/174
(Continued)

FOREIGN PATENT DOCUMENTS

CN     2293610 Y    10/1998
CN    101522508 A    9/2009
(Continued)

OTHER PUBLICATIONS

International Search Report (PCT/ISA/210) dated Jun. 2, 2014, with English translation (four (4) pages).
(Continued)

*Primary Examiner* — Gary Estremsky
(74) *Attorney, Agent, or Firm* — Crowell & Moring LLP

(57) ABSTRACT

A screwed assembly consists of at least one pre-punched, upper and an unpunched, lower component, an intermediate layer arranged in between, and a plurality of self-drilling fastening screws which are introduced via a pre-punch hole in the upper component and screwed to the unpunched component with the interposition of the intermediate layer. In order to effectively prevent in a simple manner any still uncured intermediate layer material from flowing out of the upper component surface when the fastening screws are screwed in, the pre-punches in the upper component are designed as blind holes which are closed by a thin-walled web.

6 Claims, 2 Drawing Sheets

(51) Int. Cl.
  *B62D 27/06* (2006.01)
  *F16B 25/10* (2006.01)
  *B62D 27/02* (2006.01)
  *F16B 11/00* (2006.01)

(52) U.S. Cl.
  CPC .......... *F16B 25/106* (2013.01); *B62D 27/026* (2013.01); *F16B 11/006* (2013.01)

(58) Field of Classification Search
  USPC ........................................ 411/82, 82.2, 386
  See application file for complete search history.

(56) References Cited

U.S. PATENT DOCUMENTS

| | | | |
|---|---|---|---|
| 4,868,968 A * | 9/1989 | Dixon .................... | B29C 66/74 264/263 |
| 8,678,732 B2 * | 3/2014 | Balbo Di Vinadio .. | E05D 5/023 411/386 |
| 2007/0048106 A1 * | 3/2007 | Christ .................. | F16B 37/048 411/82 |
| 2008/0088157 A1 | 4/2008 | Chen et al. | |
| 2009/0278371 A1 | 11/2009 | Fuchs et al. | |
| 2010/0183404 A1 | 7/2010 | Draht et al. | |
| 2013/0195579 A1 * | 8/2013 | Freis ........................ | F16B 5/02 411/387.1 |
| 2014/0227058 A1 * | 8/2014 | Stangl ................... | F16B 11/006 411/82.2 |
| 2015/0285290 A1 * | 10/2015 | Roehrl ................ | B62D 27/026 411/82 |
| 2015/0328677 A1 * | 11/2015 | Pfeiffer ................ | B21K 25/005 29/505 |

FOREIGN PATENT DOCUMENTS

| | | |
|---|---|---|
| CN | 201761109 U | 3/2011 |
| CN | 202418173 U | 9/2012 |
| DE | 10 2007 033 126 A1 | 1/2009 |
| DE | 10 2009 009 112 A1 | 11/2010 |
| DE | 10 2010 026 040 A1 | 1/2012 |
| DE | 10 2011 114 801 A1 | 5/2012 |
| EP | 2 311 713 A1 | 4/2011 |
| WO | WO 98/18670 A1 | 5/1998 |

OTHER PUBLICATIONS

German Search Report dated Jan. 8, 2014, with partial English translation (ten (10) pages).
Chinese Office Action issued in counterpart Chinese Application No. 201380050188.4 dated Mar. 7, 2016, with English translation (twelve (12) pages).
Chinese-language Office Action issued in counterpart Chinese Application No. 201380050188.4 dated Oct. 26, 2016 with English translation (Fifteen (15) pages).

* cited by examiner

SCREWED ASSEMBLY

CROSS REFERENCE TO RELATED APPLICATIONS

This application is a continuation of PCT International Application No. PCT/EP2013/074673, filed Nov. 26, 2013, which claims priority under 35 U.S.C. §119 from German Patent Application No. 10 2012 222 640.0, filed Dec. 10, 2012, the entire disclosures of which are herein expressly incorporated by reference.

BACKGROUND AND SUMMARY OF THE INVENTION

The invention relates to a screwed assembly, consisting of at least one pre-punched upper component and one unpunched lower component, an intermediate layer arranged therebetween, and also multiple fastening screws which are each inserted via a pre-punch into the upper component and, with the intermediate layer interposed, are screwed together with the unpunched component.

Such a screwed assembly for motor vehicle body parts is known from EP 2 311 713 A1, in which an outer, pre-punched steel flange is connected to an internal aluminum tube in a load-resistant manner via self-tapping fastening screws and an adhesive layer. The self-tapping fastening screws are inserted from the side of the pre-punches into the steel flange. In this case, the fastening screws are frequently tightened in the still uncured state of the adhesive layer for manufacturing reasons, with the result that the adhesive material can be displaced in an uncontrolled manner.

The object of the invention is to implement a screwed assembly of the claimed type so that interfering material movements of the intermediate layer, i.e., in particular the adhesive layer, which is uncured during the tightening of the screw connections, can be suppressed in a structurally simple manner.

This and other objects are achieved according to the invention by the screwed assembly consisting of at least one pre-punched, upper component and one unpunched, lower component, an intermediate layer arranged therebetween, and multiple self-tapping fastening screws, which are each inserted via a pre-punch into the upper component and are screwed together in the uncured state of the intermediate layer with the unpunched component, wherein the pre-punches in the upper component are implemented as blind holes closed by a web.

According to the invention, the pre-punch through the thin-walled pre-punch web in conjunction with the fastening screw which penetrates through the pre-punch web is securely closed in a simply manufactured manner. Thus, the intermediate layer material is effectively prevented from exiting from the pre-punch and material particles are prevented from being able to be spun away outward onto the component surface or into the surroundings by the rotating fastening screw. But, nonetheless, it is ensured that the tightening torque and the drilling length of the self-tapping fastening screw, independently of the wall thickness of the upper component on the screw head side, remain unchanged within the limits predefined by the screw connection to the unpunched, lower component.

In a further advantageous embodiment of the invention, the pre-punch web is arranged at a point of the pre-punch which is remote from the component surface on the intermediate layer side. Thus, a compensation chamber delimited on the outside by the pre-punch web results, into which excess intermediate layer material, specifically in particular adhesive material, can escape without force during the tightening of the fastening screw.

With regard to a further manufacturing simplification, the pre-punched component is expediently a cast part, preferably made of aluminum, so that the pre-punch web can also be molded on to the component during the casting operation without subsequent machining.

For reasons of a high-strength and, at the same time, chip-free screw connection, it is finally advisable to use flow drilling screws as the self-tapping fastening screws.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
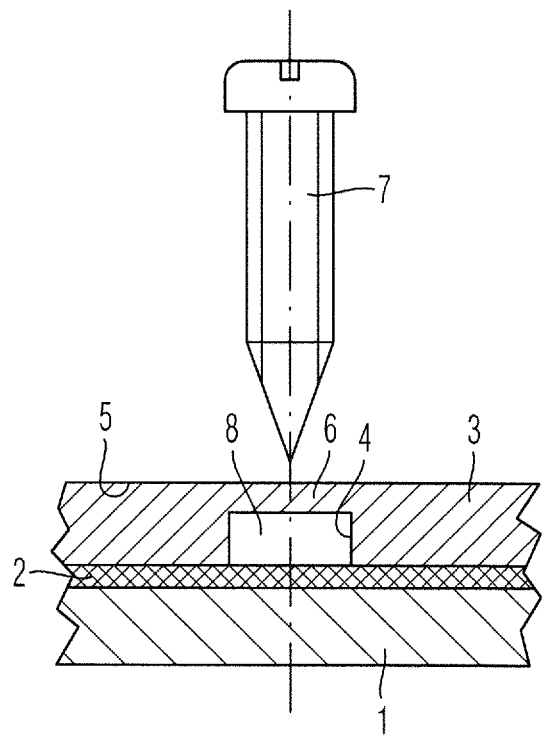
FIGS. 1a, b show a first exemplary embodiment of a screwed assembly according to the invention before (a) and after (b) the manufacturing.
Figure 1B:
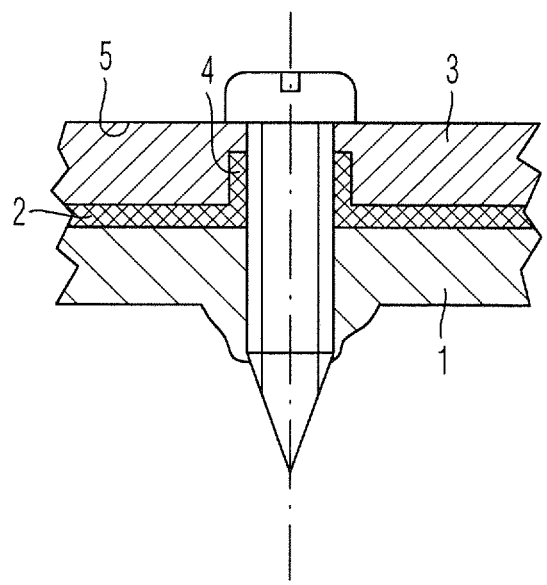

The screwed assembly shown in FIG. 1 consists of a unpunched, lower steel plate 1, an adhesive intermediate layer 2 applied thereon, and a pre-punched, upper component 3 in the form of an aluminum cast part. The pre-punches are in the form of blind or pocket holes and are closed on the side of the outer component surface 5 by a thin-walled pre-punch web 6. During the production of the component 3, the pre-punches 4, including the pre-punch webs 6, are also molded in the casting mold.

The multilayer stack 1, 2, 3, is clamped together (by a clamping device (not shown)). Then, the multilayer stack 1, 2, 3 is screwed together with the aid of flow drilling screws 7, which are screwed in through the pre-punch web 6 and the adhesive layer 2 into the unpunched, lower steel plate 1. In this case, the adhesive is in a not yet cured state. The pre-punch web 6 ensures that adhesive cannot exit from the intermediate layer 2 via the pre-punch 4 and then cannot be spun away outward by the flow drilling screw 7, which is driven at high speed. As furthermore shown in FIG. 1, the pre-punch web 6 delimits a compensation chamber 8, which is open toward the adhesive layer 2, and into which the adhesive can escape during the tightening of the screw connection, as is apparent from FIG. 1b, in which the screwed assembly is shown in the finished state.

Figure 2:
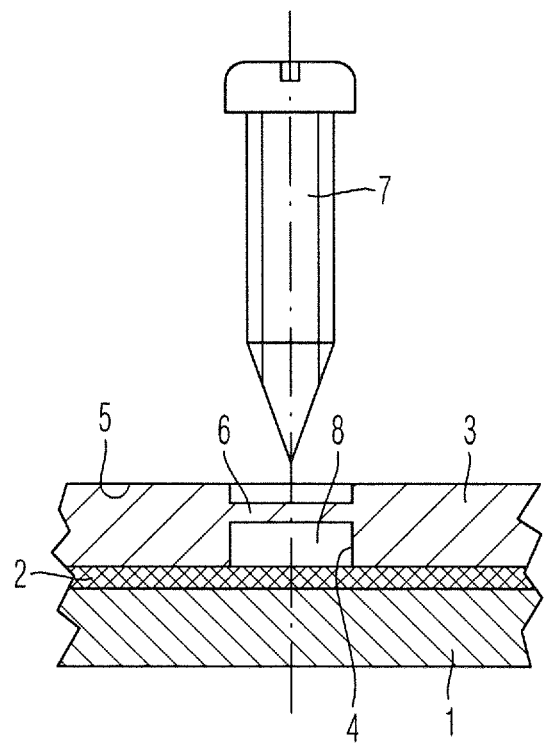
FIG. 2 shows an illustration corresponding to FIG. 1a of a further exemplary embodiment having another component combination with respect to material and a pre-punch web positioned approximately in the pre-punch center.

FIG. 2, where the components corresponding to the first exemplary embodiment are identified by the same reference signs, shows the option of positioning the pre-punch web 6 at another location, specifically in the middle of the pre-punch 4, for example. FIG. 2 also shows different component combinations (which are arbitrary within broad limits) for the screwed assembly. Thus—inversely to the first exemplary embodiment—the lower, unpunched component 1 consists of an aluminum plate and the upper, pre-punched component 3 consists of a steel plate, in which the pre-punches 4, including the thin-walled pre-punch webs 6, are formed during a rolling operation or by machining. Otherwise, the manufacturing and construction is the same as in the first exemplary embodiment.

Figure 3:
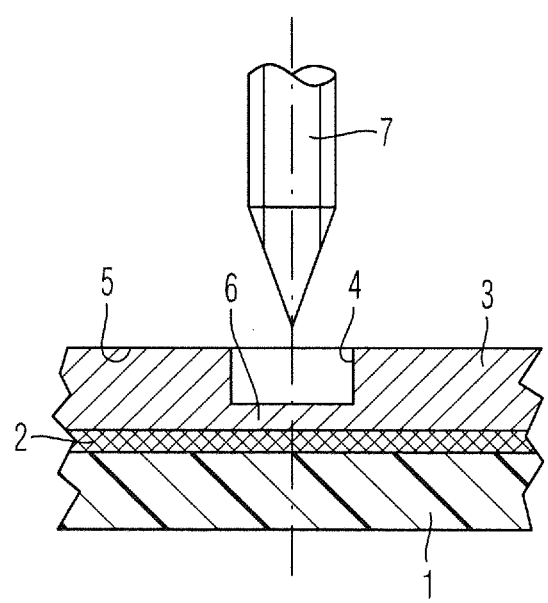
FIG. 3 shows a third exemplary embodiment having a pre-punch web positioned differently once again and yet another material combination of the component assembly.

According to FIG. 3, in which the components corresponding to the above-described exemplary embodiments are again identified by the same reference signs, the pre-punch web 6 is arranged at the end of the pre-punch 4 on the intermediate layer side, so that an adhesive-receiving compensation chamber is absent and, therefore, the adhesive volume completely remains in the adhesive layer 2 as the flow drilling screw 7 is tightened. According to FIG. 3, still another material combination is selected for the components 1, 3, specifically aluminum for the pre-punched, upper component 3 and an organic plate made of a thermoplastic fiber composite material for the unpunched, lower component 1. Otherwise, the production and construction is the same as in the above-described exemplary embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A screwed assembly, comprising:
   a pre-punched upper component, the pre-punched upper component including pre-punches in the form of blind holes;
   an unpunched lower component;
   an intermediate layer arranged between the upper component and the lower component; and
   multiple self-tapping fastening screws,
   wherein
      each of the blind hole pre-punches formed in the upper component are closed by a web spaced away from a side of the upper component that faces the lower component when the upper and lower components are adjacent in a pre-assembled state, and
      the assembled state is a state resulting from insertion of the multiple self-tapping fastening screws into respective ones of the pre-punches of the upper component and into the intermediate layer and the unpunched lower component while the intermediate layer is in an uncured state.

2. The screwed assembly according to claim 1, wherein the web closing each blind hole is a thin-walled web relative to a thickness of the pre-punched component.

3. The screwed assembly according to claim 1, wherein the pre-punched component is a cast aluminum part.

4. The screwed assembly according to claim 1, wherein the intermediate layer is an adhesive layer connecting the upper and lower components in a corrosion-resistant and load-resistant manner.

5. The screwed assembly according to claim 1, wherein the web is arranged at a location of the pre-punch inwardly with respect to outer surfaces of the pre-punched component.

6. The screwed assembly according to claim 1, wherein the web is arranged at a location of the pre-punch near a surface of the component on the intermediate layer.

* * * * *